(12) United States Patent
Uszkoreit et al.

(10) Patent No.: US 9,275,034 B1
(45) Date of Patent: *Mar. 1, 2016

(54) EXCEPTIONS TO ACTION INVOCATION FROM PARSING RULES

(71) Applicant: Google Inc., Mountain View, CA (US)

(72) Inventors: Jakob D. Uszkoreit, San Francisco, CA (US); Percy Liang, Palo Alto, CA (US); Daniel M. Bikel, Mount Kisco, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,394

(22) Filed: Jul. 22, 2015

Related U.S. Application Data

(63) Continuation of application No. 13/926,805, filed on Jun. 25, 2013, now Pat. No. 9,117,452.

(51) Int. Cl.
| | |
|---|---|
| *G06F 17/27* | (2006.01) |
| *G10L 21/00* | (2013.01) |
| *G10L 25/00* | (2013.01) |
| *G10L 15/18* | (2013.01) |
| *G10L 15/00* | (2013.01) |

(52) U.S. Cl.
CPC ................................. *G06F 17/2705* (2013.01)

(58) Field of Classification Search
CPC ....................................................... G06F 17/02
USPC .......................... 704/1, 9, 10, 257, 270–275
See application file for complete search history.

(56) References Cited

U.S. PATENT DOCUMENTS

| | | | |
|---|---|---|---|
| 5,212,821 A | 5/1993 | Gorin | |
| 5,797,123 A | 8/1998 | Chou | |
| 9,117,452 B1 * | 8/2015 | Uszkoreit | ........... G10L 15/1822 |
| 2006/0190261 A1 | 8/2006 | Wang | |
| 2012/0290509 A1 | 11/2012 | Heck | |

FOREIGN PATENT DOCUMENTS

| | | |
|---|---|---|
| EP | 834862 A3 | 12/1998 |
| WO | WO0014727 A1 | 3/2000 |

OTHER PUBLICATIONS

Bonino et al., "Dynamic Optimization of Semantic Annotation Relevance" in Evolutionary Computation CEC2004, Congress on Evolutionary Computation, 2004, pp. 1301-1308.

Chen et al., "Diverse Topic Phrase Extraction from Text Collection" WWW 2006, 9 pages.

(Continued)

*Primary Examiner* — Jesse Pullias
(74) *Attorney, Agent, or Firm* — Fish & Richardson P.C.

(57) ABSTRACT

A language processing system identifies, from log data, command inputs that parsed to a parsing rule associated with an action. If the command input has a signal indicative of user satisfaction, where the signal is derived from data that is not generated from performance of the action (e.g., user interactions with data provided in response to the performance of another, different action; resources identified in response to the performance of another, different action having a high quality score; etc.), then exception data is generated for the parsing rule. The exception data specifies the particular instance of the sentence parsed by the parsing rule, and precludes invocation of the action associated with the rule.

15 Claims, 4 Drawing Sheets

(56) References Cited

OTHER PUBLICATIONS

Gorin et al., "An Experiment in Spoken Language Acquisition", IEEE Transactions on Speech and Audio Processing, 2 (1)(II), 1994, pp. 224-240.

Gupta et al., "Segmenting Spoken Language Utterances Into Clauses for Semantic Classification" in Automatic Speech Recognition and Understanding (ASRU 2003), 2003 IEEE Workshop, pp. 525-530.

Kawahara et al., "Topic Independent Language Model for Key-Phrase Detection and Verification", Acoustics, Speech, and Signal Processing, 1999, 1999 IEEE International Conference, pp. 685-688.

Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet: http://www.cs.cmu.edu/~yvchen/doc/ICASSP12_LTModel.pdf.

Lehuen et al., "A Robust Semantic Parser Designed for Spoken Dialog Systems" in 2010 IEEE Fourth International Conference on Semantic Computing (ICSC), 2010, pp. 52-55.

Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cmu.edu/~ananlada/SemanticRoleLabelingASRU05.pdf.

Wong et al., "Improvements on a Semi-Automatic Grammar Induction Framework" in IEEE Automatic Speech Recognition and Understanding Workshop, 2001, pp. 288-291. [online] [Retrieved on Jan. 31, 2013], Retrieved from the internet: http://www1.se.cuhk.edu.hk/~hccl/publications/pub/Meng__ASRU2001_NLU.pdf.

Wu et al., "KIP: A Keyphrase Identification Program with Learning Functions" in Proceedings of the International Conference on Information Technology: Coding and Computing (ITCC'04), vol. 2, 5 pages.

Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

Krulwich et al., "Learning user information interests through the extraction of semantically significant phrases" AAAI Technology Report SS-96-05, Compilation, pp. 110-112, Mar. 1996.

* cited by examiner

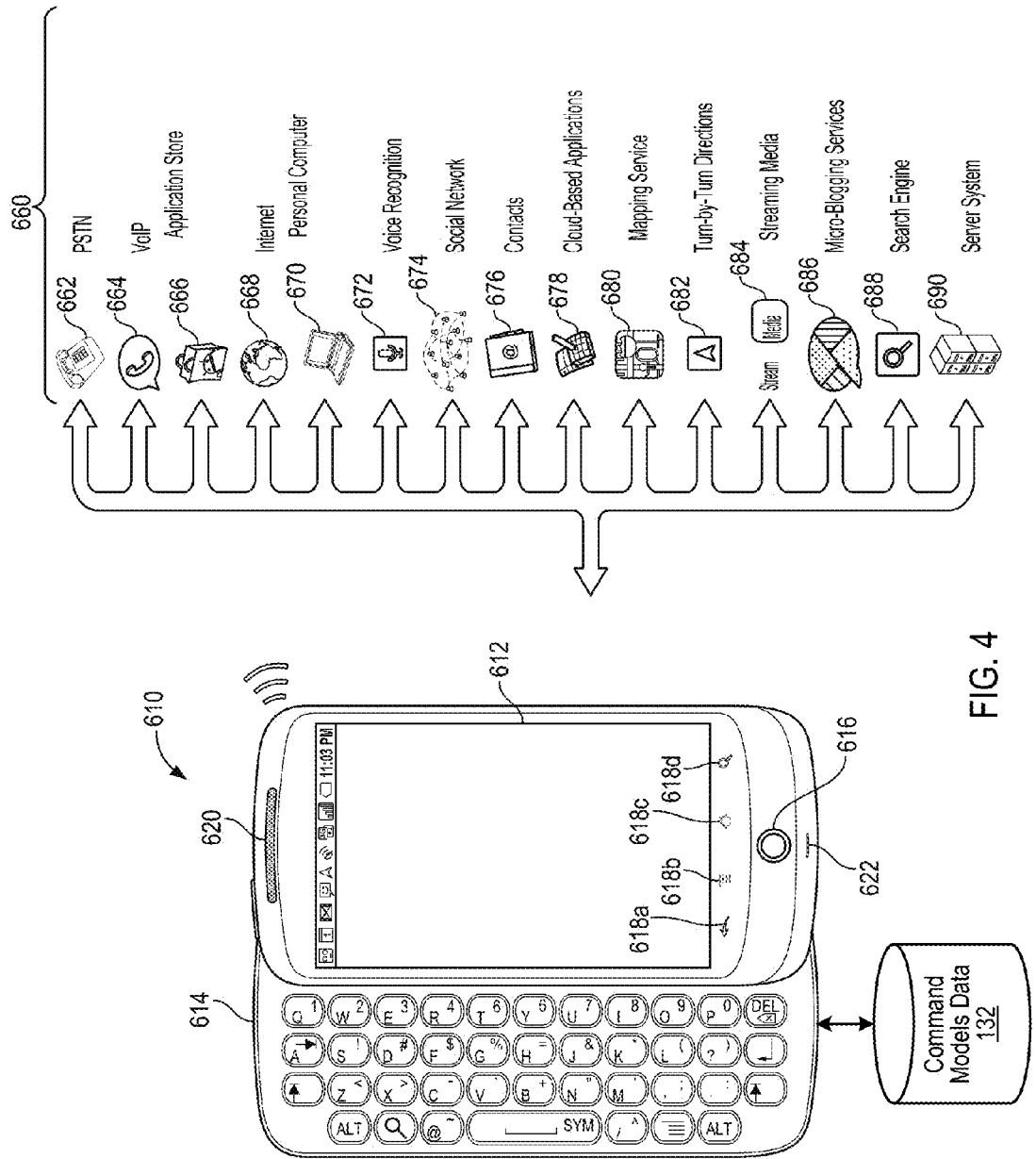

EXCEPTIONS TO ACTION INVOCATION FROM PARSING RULES

CROSS-REFERENCE TO RELATED APPLICATIONS

This application is a continuation application of, and claims priority to, U.S. patent application Ser. No. 13/926,805, titled "Exceptions to Action Invocation from Parsing Rules," filed on Jun. 25, 2013. The disclosure of the foregoing application is incorporated herein by reference.

BACKGROUND

This specification relates to speech recognition and speech understanding systems.

Speech recognition and speech processing systems are prevalent in many consumer electronic devices. Many of these electronic devices now utilize speech command processing techniques to invoke and perform particular operations. For example, a user device, such as a smart phone, can process speech commands to perform specified operations that include searching the web, setting an alarm, calling a particular person, and so on.

A user device uses a speech recognition processing system to recognize and process speech commands. A provider of the speech recognition and processing system develops parsing rules for various commands a user will speak. Upon a successful parse of a command input by a rule, the action is performed (or may be performed subject to user confirmation). The parsing rules are often in the form of a command structure for a particular action, e.g., an action n-gram, followed by preposition, followed by n-grams that defines a subject of the action, such as:

<Image_Search_Action_Term> of <Image_Subject>

The above generalized parsing rule, for example, successfully parses the following command inputs, where image search action terms include [image], [pictures] and [photos]:

Image of giraffes
    Pictures of flowers
    Photos of bridges

There are, however, inputs that may be parsed by a rule associated with an action, but the user may not intend for the action to be performed. For example, for the input "Picture of Dorian Gray," the user may actually be more interested in a search of a web corpus or a book corpus for resources related to the book instead of a search of an image corpus for images of "Dorian Gray." Accordingly, some commands may parse to an action that is different from the action the user actually desires to be performed.

SUMMARY

In general, one innovative aspect of the subject matter described in this specification can be embodied in methods that include the actions of accessing command input logs storing: data defining received input sentences, each input sentence being one or more n-grams; data indicating a first action performed by user devices from which input sentences were received, the first action having been performed, in part, in response to an input sentence being successfully parsed by a first parsing rule that is associated with the first action; identifying first input sentences that are successfully parsed by the parsing rule; identifying a second input sentence having a signal indicative of user satisfaction, wherein the second input sentence is identified from among the first input sentences, and the signal is derived from data that is independent of performance of the first action; and generating data that precludes invocation of the first action for the second input sentence. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The system identifies command input sentences that successfully parsed for a rule associated with an action but that also have a signal of user satisfaction that is derived independent of the action having been performed. In other words, the identified command input sentences are sentences for which users' behavior, or other data that is not provided pursuant to the action associated with the rule that parses the input sentence, is indicative of user satisfaction. From these sentences are derived data, such as parsing annotations, that preclude invocation of the action when the sentence is again received and parsed by the rule. For all other sentences that are not specified by an annotation, however, the action can be invoked. This simplifies exception training, as exceptions can be identified from underlying data and processed after the parsing rule is in use instead of trained or manually labeled by human supervisors during the training phase. This also results in fewer training resources and time required to build command models.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a block diagram of an example mobile computing device.

Like reference numbers and designations in the various drawings indicate like elements.

DETAILED DESCRIPTION

A language processing system identifies, from log data, command inputs that parsed to a parsing rule associated with an action. If the command input has a signal indicative of user satisfaction, where the signal is derived from data that is not generated from performance of the action (e.g., user interactions with data provided in response to the performance of another, different action; resources identified in response to the performance of another, different action having a high quality score; etc.), then exception data is generated for the parsing rule. The exception data specifies the particular instance of the sentence parsed by the parsing rule, and precludes invocation of the action associated with the rule.

Figure 1:
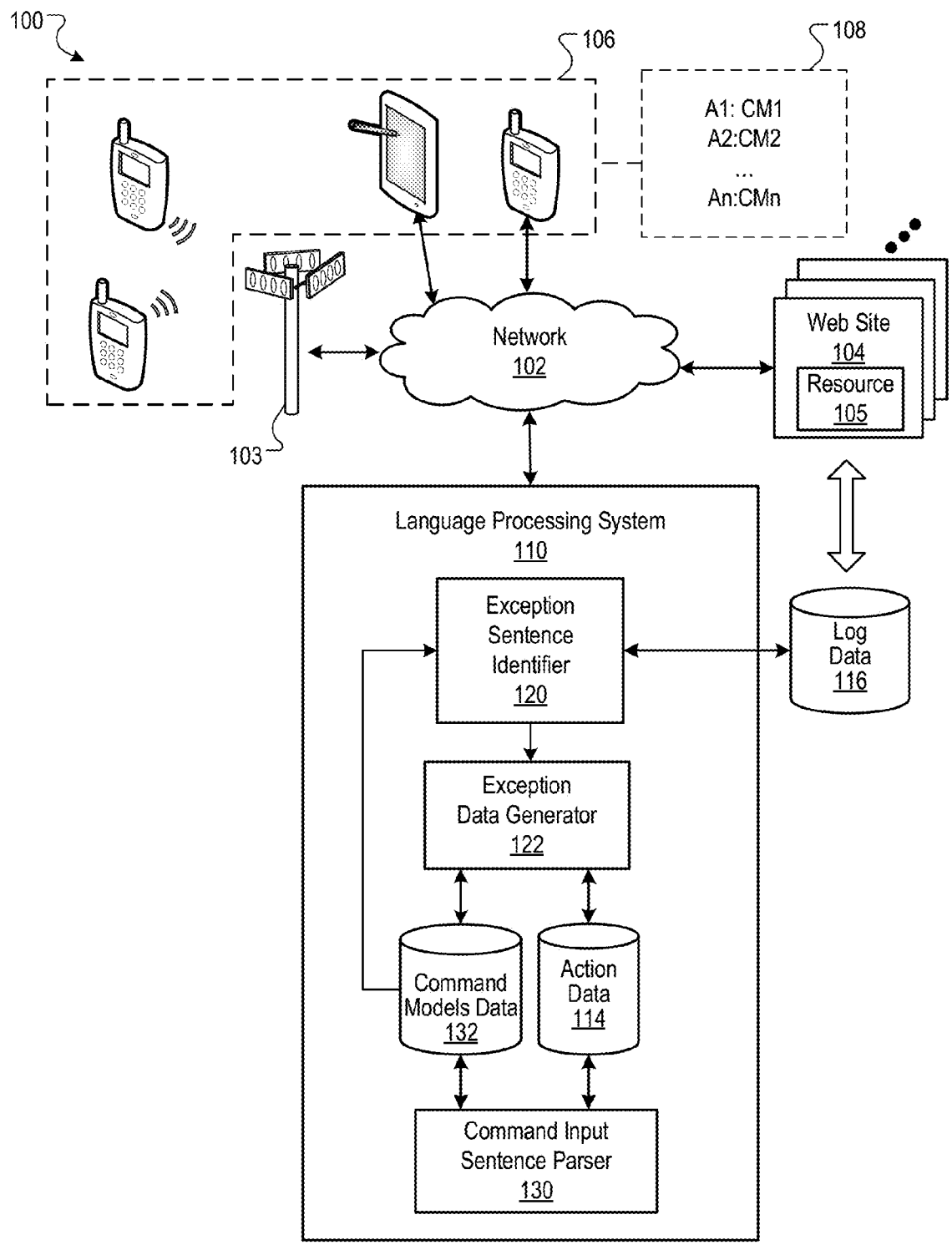
FIG. 1 is a block diagram of an environment in which are generated exception data that precludes invocation of an action for a particular input sentence that can be parsed by a parsing rule.

FIG. 1 is a block diagram of an environment in which the command models for corresponding actions are utilized. A computer network 102, such as a local area network (LAN), wide area network (WAN), the Internet, or a combination thereof, provides for data communication between electronic devices and systems. Examples of such electronic device and systems include web sites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

In addition to providing content, particular websites 104 may also provide one or more services. Example services include a search service provided by a search engine, video serving provided by video hosting servers, a mapping service providing by a map server, and so on.

A user device 106 is an electronic device that is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. An example mobile user device 106, such as a smart phone, is described with reference to FIG. 4 below. The user devices 106 may communicate over the networks 102 and 103 by means of wired and wireless connections.

As described with reference to FIG. 4, a user device may be able to perform a set of device actions for various programs and capabilities. The actions may differ from each other for each action. For example, a telephone functionality may include the action placing a call in response to the commands of "call" or "phone," a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command to "accept" or "decline," the invitation; a mapping service may include the actions of "mapping" a location in response to the command to "map" a location; and so on. The actions may be performed entirely by the user device, e.g., in the case of placing a phone call, or the user device may invoke an external service to perform the action, e.g., a map service or a search engine service.

In some implementations, the user device 106 utilizes a voice recognition system that receives voice command inputs, performs language recognition processing, and parses the resulting recognized words and phrases. The parsed words and phrases, which are referred to as n-grams, where each n-gram may constitute one or more words, are then processed to determine whether the voice input invokes a particular action.

As will be described in more detail below, each action A1, A2 . . . An has a corresponding command model CM1, CM2 . . . CMn, as indicated by the phantom box 108. The user device 106 utilizes the command models CMx to determine which, if any, actions are invoked in response to a voice input. As will be described in more detail below, the command models are, in some implementations, grammars that describe sentence structures for particular commands. Other appropriate command models may also be used.

As used in this specification, "command input" or "command input sentence" can be an input sentence, a query, or any other input that has one or more terms. The input does not need to be a grammatically correct and complete sentence, e.g., it need not have both a predicate and a subject. For example, the following input would constitute a command input, but would not constitute a grammatically complete sentence: "Images of lions." A command input need not have an associated parsing rule, nor have annotations or other data describing terms of the command input. The language processing system, in some implementations, can process command inputs to generate a parsing rule and provide such annotations. In general, any input of one or more terms can be a command input, regardless of whether the particular command input is associated with other language processing data, such as parsing rules, parts of speech tagging, etc.

In some implementations, the command inputs of user devices 106 are stored in log data 116. The log data 116 stores data defining device sessions, command inputs received during the sessions, and actions taken in response to the command inputs. As used in this description, is device session, or simply a session, is defined by one or more command inputs that are received and grouped together to indicate they occurred during a session. The session can be defined by a variety of appropriate ways. For example, a session may be a set of command inputs received during a predefined time period, e.g., 30 minutes; or may be up to N inputs, e.g., up to 50 inputs; or may be a period during which a user maintained interactions with the user device until an inactivity time out (e.g., five minutes) occurred. Other appropriate criteria to define a session can also be used.

For each command input, the log data 116 also stores data describing actions taken in response to the command input. The data describing actions taken in response to the command input can be, for example, data describing service requests and parameters passed to the service; actions taken at the user device, such as the setting of a calendar entry; etc. Furthermore, some of the command inputs may not directly result in action performed by the user device. This may be the result of a command input not being parsed by rule associated with an action; or being parsed by a rule associated with an action that is not an action the user desires; or for some other reason.

The log data 116 also indicates, for each session, the sequence of command inputs. Ordinal positions of the command inputs for each session can be defined by timestamps, sequence values, or other appropriate data that can be used to derive an ordinal position of a command input relative to other command inputs for a session. The log data 116 can thus be used by the language processing system 110 to determine the respective sequences of command inputs submitted by the user devices, the actions taken in response to the command inputs, and how often the command inputs have been submitted.

In some implementations, a language processing system 110 is used to parse the command input sentence and determine which, if any action, is to be performed. As shown in FIG. 1, the language processing system 110 is separate from the user devices. However, certain features of the language processing system 110 can instead be implemented within each user device, such as the command input sentence parser 130. Furthermore, the example architecture of the language processing system 110 is illustrative only, and other appropriate functional architectures can also be used.

The language processing system 110 receives command input sentences from user devices 106 and provides responsive data back to the user devices 106. Such responsive data may be, for example, a fully parsed sentence, the action invoked, and arguments to be passed to the service that performs the action.

The language processing system 110 includes command models data 132 that associates actions with corresponding command models by use of parsing rules, such as grammars. The command models data 132 store command models for actions specified by action data 114, and are generated by a system external to the language processing system 110. In some implementations, the command models are each configured to generate an action score for an action for an input sentence based on, for example, a semantic meaning of the input sentence.

In some implementations, the language processing system 110 determines exceptions for particular instances of command input sentences that successfully parse for a parsing rule. For each exception, a successful parse the parsing rule will not invoke an action associated with the parsing rule. For example, as described above, an example parsing rule for an image search operation may be:

<Image_Search_Action_Term> of <Image_Subject>

As will be described below, data is generated that describes an exception for the command input "Picture of Dorian Gray." Thus, upon receiving the command input "Picture of Dorian Gray," a user device utilizing the command models 132 will not invoke an action for an image search of "Dorian Gray."

By way of another example, suppose a parsing rule for a request for weather data is of the form:

<City_Name><Weather_Term> where City_Name is a parameter for city names, and Weather_Term is a parameter for a predefined list of weather terms, such as [weather], [forecast]. The parsing rule is associated with an action that causes the user device to request a weather forecast for a city specified by the City_Name value when a command input is received and that successfully parses to the parsing rule. Suppose, however, there is a popular band with the name "Rockville Weather." Because Rockville is the name of a city, the command input will cause a user device to request a weather forecast for the city of Rockville. However, as will be described below, exception data is created, and the exception data precludes this action from happening when the command input "Rockville weather" is received. However, for the command input "Rockville forecast", an action that request the weather for Rockville is performed, as the exception data specifies instances of command inputs for which action invocation is to be precluded.

Figure 2:
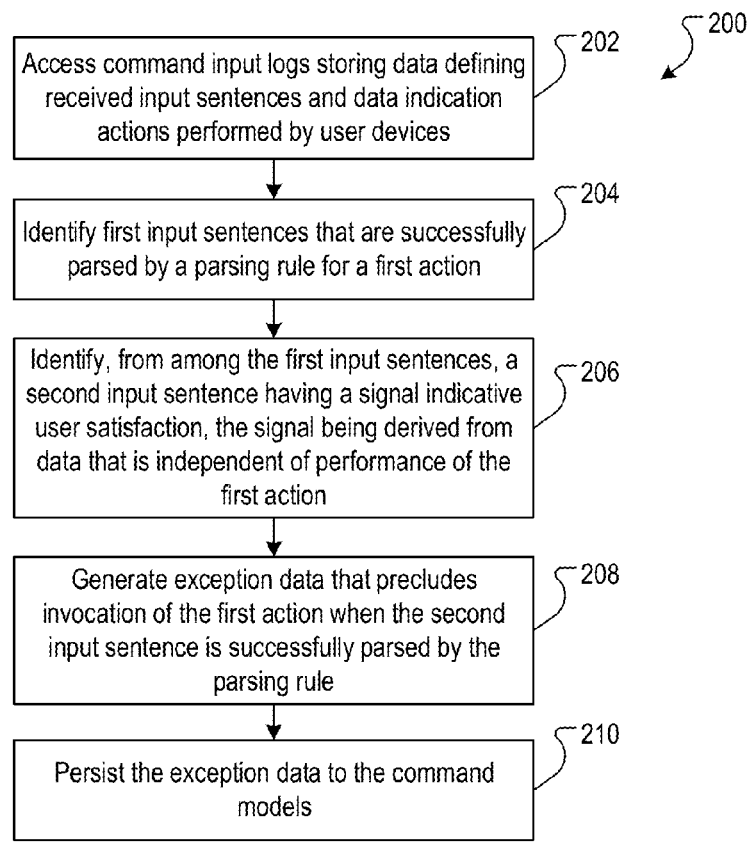
FIG. 2 is a flow diagram of an example process for generating exception data.

In particular, the language processing system exception sentence identifier 120 and an exception data generator 122. The exception sentence identifier 120 identifies command input sentences that were successfully parsed a parsing rule, and from those sentences identifies a proper subset that include command sentences that each have a signal indicative of user satisfaction. Operation of the exception sentence identifier 120 and the exception data generator 122 are described with reference to FIG. 2, which is a flow diagram of an example process for generating exception data.

The exception sentence identifier 120 accesses command input logs storing data defining received input sentences and data indication actions performed by user devices (202). For example, exception sentence identifier 120 accesses the log data 116 that includes data defining received input sentences. For at least some of the sentences, the data also indicates a first action that was performed by a user device from which each sentence was received. The first action was performed, in part, in response to an input sentence being successfully parsed by a first parsing rule that is associated with the first action.

The exception sentence identifier 120 identifies first input sentences that are successfully parsed by the parsing rule associated with the first action (204). For example, assume that the first action is an image search for the parsing rule:

<Image_Search_Action_Term> of <Image_Subject>,

Also assume that the following sentences are successfully parsed by the parsing rule associated with the image search action and are thus identified:

Image of giraffes;
Pictures of flowers;
Photos of bridges; and
Picture of Dorian Gray The exception sentence identifier 120 identifies, from among the first input sentences, a second input sentence having a signal indicative user satisfaction, the signal being derived from data that is independent of performance of the first action (206). Data that is independent of the performance of the first action are data that is provided to a user device in response to another, different action, and/or data based on user interactions in response to data provided in response to the performance of another, different action. Example processes for determining whether a first input sentence has a signal indicative of user satisfaction to identify the second input sentences are described with reference to FIGS. 3A and 3B below.

The exception data generator 122 generates exception data that precludes invocation of the first action when the second input sentence is successfully parsed by the parsing rule (208). The exception data specifies the particular instance of the sentence parsed by the parsing rule, and precludes invocation of the action associated with the rule. For example, for the command input sentences above, the command input sentence [Picture of Dorian Gray] is identified as a second input sentence having a signal indicative of user satisfaction. Accordingly, the exception data generator 122 generates data that specifies the particular instance of the sentence parsed by the parsing rule, i.e., [Picture of Dorian Gray] and associates the exception data with the rule <Image_Search_Action_Term> of <Image_Subject>.

The exception data generator 122 persists the exception data to the command models (210). For example, in one implementation the exception data generator 122 persists the association of the exception data for [Picture of Dorian Gray] with the rule <Image_Search_Action_Term> of <Image_Subject> in the command models data 132. Thereafter, when command input sentence parser receives a sentence to parse, it checks the exception data for a match. If there is a match, the command input sentence parser will not generate an action request for the rule that can successfully parse the matching command input sentence. Thus, for the command input sentence [Picture of Dorian Gray], an image search request is not generated. Conversely, for the command input sentence [Pictures of flowers], an image search request is generated.

Figure 3A:
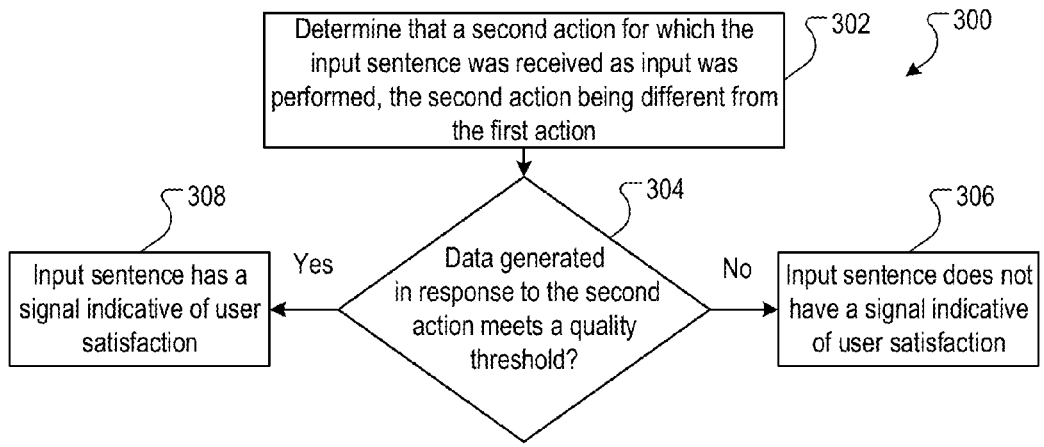
FIG. 3A is a flow diagram of an example process for determining whether an input sentence has a signal indicative of user satisfaction.

FIG. 3A is a flow diagram of an example process for determining whether an input sentence has a signal indicative of user satisfaction. The process 300 is performed in the exception sentence identifier 120. For example, some services resources identified in response to the performance of another, different action having a high quality score; etc.).

The exception sentence identifier 120 determines that a second action for which an input sentence was received as input was performed (302). The second action is different from a first action associated with a rule that successfully parses the input sentence. For example, for the command input [Picture of Dorian Gray], one or more second actions are determined. The second actions can be the result of successful parses by other parsing rules associated with different actions; by "default" actions performed by a service (e.g., a search of a web corpus); or an action specified by the user. The second actions are not invoked by a successful parse of a parsing rule associated with the first action.

Figure 3B:
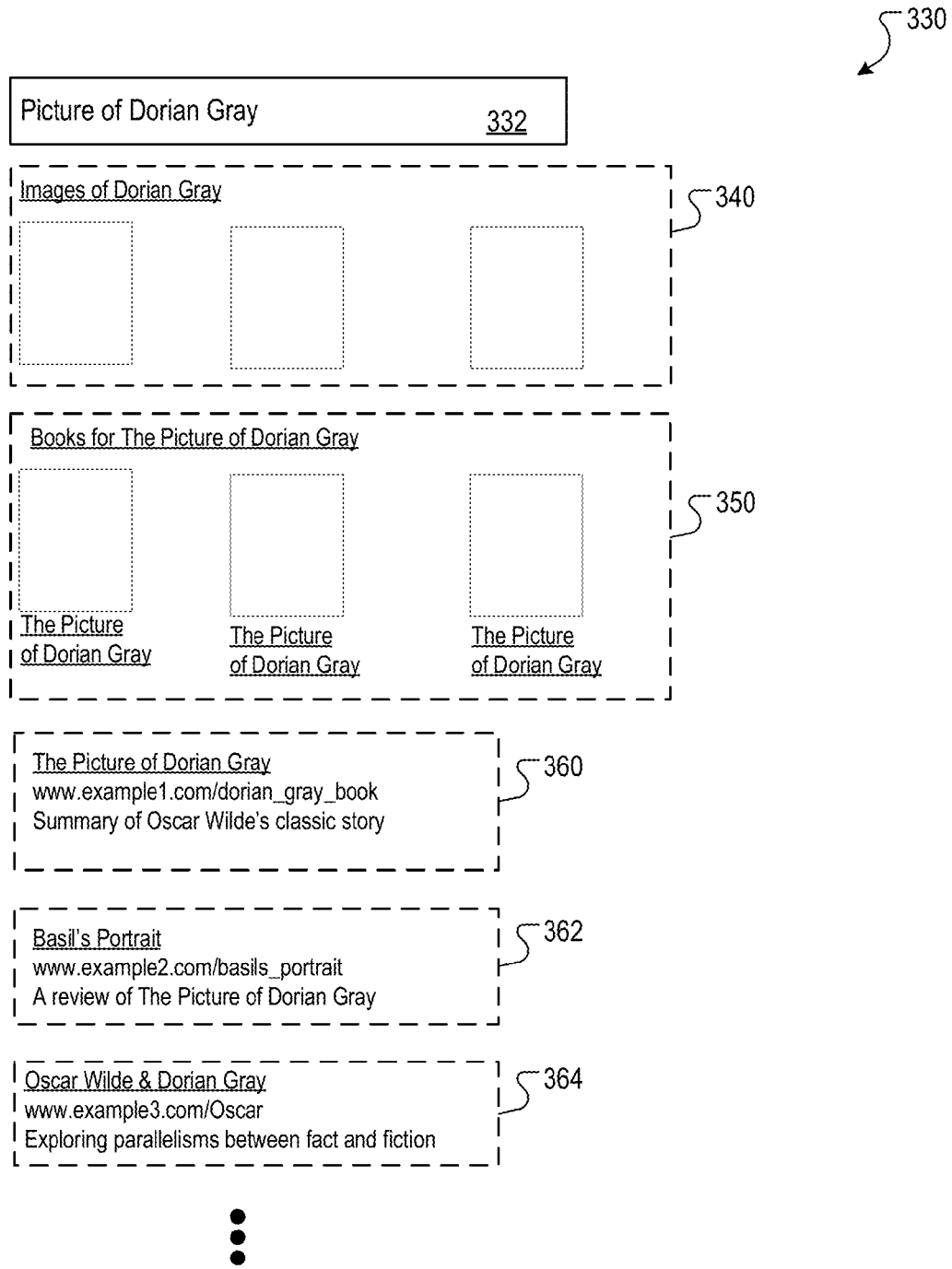
FIG. 3B is an illustration of portion of a user device display in which are displayed data provided in response to a command input.

An example user interface in which resulting data provided in response to second actions is shown in FIG. 3B, which is an illustration of portion of a user device display in which are displayed data provided in response to a command input. As shown in FIG. 3B, the command input [Picture of Dorian Gray] is displayed in an input field. The input may be the textual output of a speech recognition process, or a typed input by the user.

In response to the command input, three different actions were performed by services external to the user device. The first action corresponds to an image search, and for which image search results 340 are provided. The first action may be in response to the user device sending an image search request to an image search service in response to the parsing rule associated with an image search action successfully parsing the command input.

A second action corresponds to a book corpus search, and for which book search results 350 are provided. This second action may be in response to the user device sending a book corpus search request to a book corpus search service in response to a parsing rule associated with a book corpus search action successfully parsing the command input.

Another second action corresponds to a general web corpus search, and for which web search results 360, 362 and 364 are provided. This second action may be in response to the user device sending a default search request to a search service, or in response the neither parsing rule for the image search nor the parsing rule of the book search having a parse confidence score exceeding a threshold that would result in only that respective action being performed.

The exception sentence identifier 120 determines whether data generated in response to the second action meets a quality threshold (304). A variety of different types of quality measures can be used to make this determination. For example, for data provided in response to a search of a web corpus, in which the data responsive to the search operation are resources identified by search results for the search operation, a quality measure can be derived from quality scores of the resources. The quality scores can be, for example, authority scores of the resources that measure the authority of each resource relative to other resources, relevance scores that measure the relevance of each resource to the command input, or scores based on combinations of authority scores and relevance scores. A similar process can be done for other data provided for other actions, such a quality measure based on quality scores corresponding to book search results.

Another quality measure can be based on user behavior. For example, selection rates of web search results (e.g., search results 360, 362 and 364) can be determined from log data 116. Likewise, selection rates from book results 350 can be generated.

Other types of quality measures that are derived independent of the data provided in response to the first action can also be used.

To determine whether the data meets a quality threshold, the exception sentence identifier 120, in some implementations, compares the derived quality measure to a corresponding predefined threshold value. The predefined threshold value can be different for each action type. For example, for web corpus results with a selection rate quality measure, the selection rate may be N %; for a book corpus, the selection rate may be M %, with M being less than N. Furthermore, the predefined value can be set by system administrators, or can be a machine learned value. Alternatively the quality threshold can be a dynamic value that is adjusted based on the underlying data provided.

If the data generated in response to the second action does not meet a quality threshold, then the exception sentence identifier 120 determines the input sentence does not have a signal indicative of user satisfaction (306). Accordingly, the exception data is not generated for the sentence.

If, however, the data generated in response to the second action does meet the quality threshold, then the exception sentence identifier 120 determines the input sentence does have a signal indicative of user satisfaction (308). Accordingly, the exception data is generated for the sentence and is persisted to the commands model data 132.

There are many types of parsing rules that can be used. In some implementations, the parsing rules are grammar based rules. For example, a grammar for a text action may be of the form:

$$G=<T,N,S,R>;$$

where:
T={•}
N={Contact, Text_Action, Message}
S=S
R={
S→<Contact><Text_Action><Message>
   Contact→<Contact List>
   Text_Action→text, SMS
   Message→{•}
}

The set of terminal T may vary based on the underlying data used to develop the model. For the non-terminal <Contact>, identifiers from a contact list are used. For the non-terminal Text_Action, the terminals "text" and "SMS" are defined, and for the non-terminal message, an open set of terminals is defined. Thus, any sentence of the form <Contact><Text_Action><Message> will successfully parse to the rule. Because the rule is associated with a text action, a successful parse at a user device will cause the user device to send a text message that includes the residual text after the contact to the user device of the contact.

FIG. 4 is a block diagram of an example mobile computing device. In this illustration, the mobile computing device 610 is depicted as a handheld mobile telephone (e.g., a smartphone, or an application telephone) that includes a touchscreen display device 612 for presenting content to a user of the mobile computing device 610 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 614, physical buttons, trackballs, accelerometers, gyroscopes, and magnetometers).

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a track pad enables the user to supply directional and rate of movement information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 614. User-selection of the button may invoke the pre-defined action.

The mobile computing device 610 may include other applications, computing sub-systems, and hardware. A voice recognition service 672 may receive voice communication data received by the mobile computing device's microphone 622, and translate the voice communication into corresponding textual data or perform voice recognition. The processed voice data can be input to the command models stored in the command models data 132 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an address corresponding to the web page or selecting a link to the web page.

A service provider that operates the network of base stations may connect the mobile computing device 610 to the network 660 to enable communication between the mobile computing device 610 and other computing systems that provide services 660. The services 660 may be provided over different networks (e.g., the service provider's internal network, the Public Switched Telephone Network, and the Internet). The service provider may operate a server system that routes information packets and voice data between the mobile computing device 610 and computing systems associated with the services 660.

An application store 666 may provide a user of the mobile computing device 610 the ability to browse a list of remotely stored application programs that the user may download over the network and install on the mobile computing device 610. The application store 666 may serve as a repository of applications developed by third-party application developers. An application program that is installed on the mobile computing device 610 may be able to communicate over the network with server systems that are designated for the application program. For example, a VoIP application program may be downloaded from the application store 666, enabling the user to communicate with the VoIP service 664.

The mobile computing device 610 may access content on the internet 668 through network 102. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through the network. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the computing device 610 using a web browser or a dedicated program.

Mapping service 680 can provide the mobile computing device 610 with street maps, route planning information, and satellite images. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn directions service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
    identifying first input sentences that are successfully parsed by a first parsing rule that is associated with a first action;
    identifying from among the first input sentences a second input sentence having a signal indicative of user satisfaction, wherein the signal is derived from data that is independent of performance of the first action, the identifying comprising, for each first input sentence:
    determining that a second action for which the first input sentence was received as input was performed, the second action being different from the first action;
    determining that data responsive to the second action meets a quality threshold;
    in response to the data responsive to the second action meeting the quality threshold, determining that the first input sentence is a second input sentence having a signal indicative of user satisfaction; and
    generating data that precludes invocation of the first action for the second input sentence.

2. The computer-implemented method of claim 1, wherein the second action is a search operation, and the data responsive to the search operation are resources identified by search results for the search operation.

3. The computer-implemented method of claim 1, wherein the second action is not invoked in response to a successful parse by a parsing rule.

4. The computer-implemented method of claim 1, wherein the input sentences are generated from voice command inputs.

5. The computer-implemented method of claim 1, wherein the parsing rule is a grammar based rule.

6. A non-transitory computer readable storage medium storing instructions executable by a data processing apparatus and that upon such execution causes the data processing apparatus to perform operations comprising:
    identifying first input sentences that are successfully parsed by a first parsing rule that is associated with a first action;
    identifying from among the first input sentences a second input sentence having a signal indicative of user satisfaction, wherein the signal is derived from data that is independent of performance of the first action, the identifying comprising, for each first input sentence:
    determining that a second action for which the first input sentence was received as input was performed, the second action being different from the first action;
    determining that data responsive to the second action meets a quality threshold;
    in response to the data responsive to the second action meeting the quality threshold, determining that the first input sentence is a second input sentence having a signal indicative of user satisfaction; and
    generating data that precludes invocation of the first action for the second input sentence.

7. The non-transitory computer readable storage medium of claim 6, wherein the second action is a search operation, and the data responsive to the search operation are resources identified by search results for the search operation.

8. The non-transitory computer readable storage medium of claim 6, wherein the second action is not invoked in response to a successful parse by a parsing rule.

9. The non-transitory computer readable storage medium of claim 6, wherein the input sentences are generated from voice command inputs.

10. The non-transitory computer readable storage medium of claim 6, wherein the parsing rule is a grammar based rule.

11. A system, comprising:
    a data processing apparatus; and
    a non-transitory computer readable storage medium in data communication with the data processing apparatus storing instructions executable by the data processing apparatus and that upon such execution causes the data processing apparatus to perform operations comprising:
    identifying first input sentences that are successfully parsed by a first parsing rule that is associated with a first action;
    identifying from among the first input sentences a second input sentence having a signal indicative of user satisfaction, wherein the signal is derived from data that is independent of performance of the first action, the identifying comprising, for each first input sentence:
    determining that a second action for which the first input sentence was received as input was performed, the second action being different from the first action;
    determining that data responsive to the second action meets a quality threshold;
    in response to the data responsive to the second action meeting the quality threshold, determining that the first input sentence is a second input sentence having a signal indicative of user satisfaction; and
    generating data that precludes invocation of the first action for the second input sentence.

12. The system of claim 11, wherein the second action is a search operation, and the data responsive to the search operation are resources identified by search results for the search operation.

13. The system of claim 11, wherein the second action is not invoked in response to a successful parse by a parsing rule.

14. The system of claim 11, wherein the input sentences are generated from voice command inputs.

15. The system of claim 11, wherein the parsing rule is a grammar based rule.

* * * * *